July 20, 1937.  J. A. GUYER  2,087,540
TREATMENT OF HYDROCARBONS
Filed Aug. 11, 1934
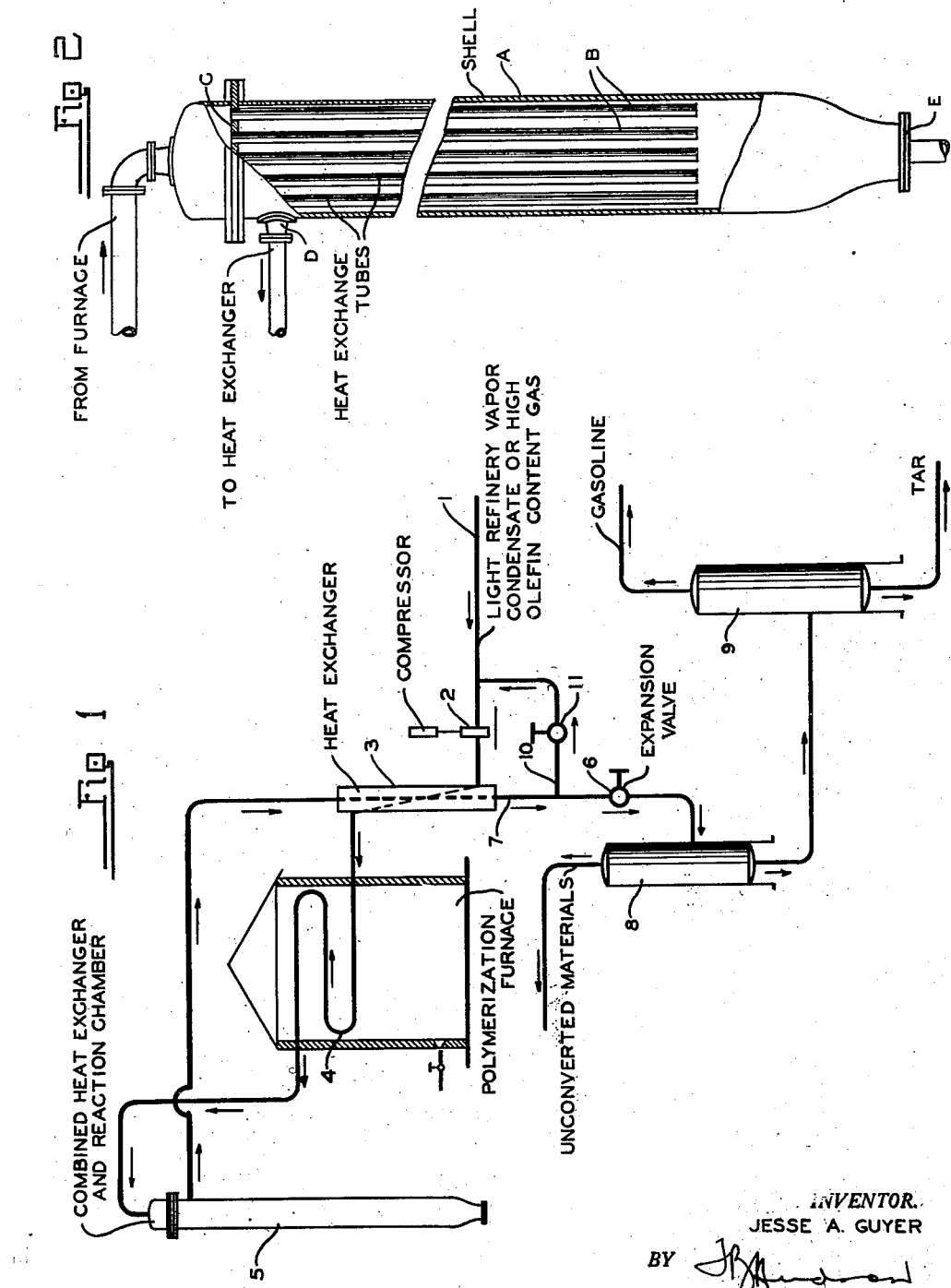
INVENTOR.
JESSE A. GUYER
BY
ATTORNEYS.

Patented July 20, 1937

2,087,540

UNITED STATES PATENT OFFICE 2,087,540

TREATMENT OF HYDROCARBONS

Jesse A. Guyer, Bartlesville, Okla., assignor to Phillips Petroleum Company, a corporation of Delaware Application August 11, 1934, Serial No. 739,498

4 Claims. (Cl. 196—10)

This invention relates to the non-catalytic polymerization of the simpler olefin hydrocarbons into normally liquid hydrocarbons generally of the gasoline boiling range. More specifically, it provides an improved and simplified process and apparatus whereby such polymerization may be effected in a more economical and controllable manner than is possible with processes heretofore proposed for this purpose.

The conversion of olefin hydrocarbons into polymeric molecules of higher molecular weight by the use of heat and pressure is a well known reaction, and its exothermic character has also been recognized. The present invention is a process wherein full advantage is taken of the exothermic nature of the reaction to utilize the heat evolved in the reaction to effect notable economies in apparatus and equipment, while conducting the reaction in a more controllable manner and avoiding the excessive production of tars and carbon such as are frequently encountered in cracking and polymerizing operations. This is accomplished by the use of suitable heat exchange equipment, preferably including a reaction chamber designed to effect indirect heat exchange between the incoming and reacting gases, as will be clear from the following description.

Referring to the attached drawing, Figure 1 is a diagrammatic drawing of apparatus suitable for carrying out the process, including the necessary auxiliary equipment for separating the products of the process, whereas Figure 2 is a more detailed drawing of a reaction chamber, such as that designated by the numeral 5 of Figure 1, and represents one modification of apparatus wherein the process may be carried out.

An apparatus suitable for conducting my process is shown in Figure 1 of the attached drawing. The apparatus comprises a heat exchanger, a reaction chamber in which the polymerization is effected, a tube coil with suitable housing for heating the hydrocarbons to be reacted and the necessary pumps, piping and equipment for charging raw stock to the process and separating the effluents of the reaction stage into normally liquid hydrocarbons, and unreacted gases, and further separating the liquid hydrocarbons into gasoline and tar.

In the operation of my process, the charging stock, containing a substantial proportion of olefins of a molecular weight not exceeding approximately 70, will be fed into the system through the line 1 to the compressor 2 wherein they will be compressed to a pressure preferably in excess of 500 pounds per square inch. From the compressor, the olefin containing hydrocarbons pass through the heat exchanger 3, and the heating coil 4 into the reaction chamber 5, entering therein at a temperature on the order of 800 to 900° F., or sufficient to initiate the exothermic polymerization reactions. Details of the reaction chamber as shown in Figure 2 of the attached drawing will be later described.

The gases and polymers will usually leave the reaction chamber at a temperature of 40° F., or more above that of the entering gases, and pass then through the heat exchanger 3, the line 7, and the pressure reduction valve 6 into the fractionator 8. Here unconverted and gaseous materials are separated as an overhead product, and the normally liquid hydrocarbons are passed from the bottom of the fractionator 8 into the fractionator 9 for separation into gasoline and tar.

An essential feature of my process is the provision of a reaction chamber wherein indirect heat exchange takes place between the incoming gases and the olefines undergoing polymerization.

One form of apparatus suitable for this purpose is shown in Figure 2 of the attached drawing. Referring to this figure, the reaction chamber comprises a housing A, preferably in the form of an elongated, cylindrical shell containing a number of spaced parallel tubes B longitudinally arranged and connected to a common inlet header C, with the other ends of the tubes open, the tubes terminating near the opposite end of the chamber. The hydrocarbons preferably enter the chamber through the tubes B, flowing out the open ends of the tubes in the far end of the reaction chamber, and returning along the outer walls of the tubes to the point of exit, marked D on the drawing. Baffling may be used within the shell if desired to make the vapors take an elongated or spiral return course through the interspaces between the tubes. Any liquid tar collecting in the reaction chamber is withdrawn through the outlet E as required.

As used in the process, a temperature rise develops as a result of the reaction and heat is imparted through the tube walls to the incoming hydrocarbon within the tubes, raising the temperature of the incoming product sufficiently to initiate rapid polymerization reactions, there being effected at the same time a control of the reaction taking place in said interspaces by this extraction of heat. The products from the polymerization vessel pass through the heat exchanger where heat is imparted to the hydrocarbon fluid entering the plant and thence to the fractionating system.

Any gaseous hydrocarbon or mixture containing a substantial proportion of the simpler olefins, particularly ethylene, propylene and butylene, is suitable for conversion in the process. The content of olefins should in general be in excess of 20 per cent of the hydrocarbon mixture but an olefin content of 30 per cent or more gives best results, there being no upper limit on the proportion of olefins in charging stock which may be converted in the process. Operating pressures of at least 1000 pounds per square inch are desirable in order to take advantage of the heat exchange without the usual production of troublesome coke and tar which may result from the high temperatures needed to effect conversion at lower pressures, but higher pressures as high as 5000 pounds per square inch or even more may be used, the pressure being limited only by the strength of the apparatus. High pressures are in general beneficial since they allow of the use of the lower reaction temperatures. Reaction temperatures between 700 and 1000° F. may be used but in most cases where an intermediate olefin content of 30–60 per cent is present in the material under conversion, pressures of 2000–4000 pounds are used which are convenient from the standpoint of apparatus construction, and a temperature in the reaction chamber between 800–950° F. is preferable, the other temperatures in the system being adjusted so as to maintain such a temperature of reaction as will yield a maximum conversion of olefins into polymers. A conversion of 65 to 80 per cent of the olefins present in the single thermal treatment is usually obtainable. A charging stock suitable for the process may be obtained from many sources provided only that the olefin content is sufficiently high and normally gaseous hydrocarbons predominate. Such a material may be obtained from the cracking of normally gaseous hydrocarbons, from the catalytic dehydrogenation of paraffins of low molecular weight or from the cracking of oil either at elevated pressures or low pressures, or from the destructive distillation of other bituminous materials. Concentrates of gaseous olefins of high olefin content, obtained by fractional distillation, are especially suitable.

The apparatus shown in Figure 1 provides a novel method for starting the process with the small heating furnace provided. The tube coil, reaction chamber and conduits are filled with charging stock and charging stock is then forced by the pump through the heat exchanger, furnace coil and reaction chamber, the same material being then returned to the inlet of the heat exchanger through the line 10 and the valve 11 while heat is applied to the furnace coil, no more than a little hydrocarbon being taken into or discarded from the apparatus during the heating, and the hydrocarbon passes several times through the heating coil, receiving each time an increment of heat. When the temperature has been raised sufficiently to initiate exothermic conversion in the reaction chamber, the reacted effluent from the reaction chamber may be allowed to pass from the exit of the heat exchanger to the fractionating system and new charging stock may be taken into the system. The heat input by the furnace coil is then reduced and adjusted to maintain the desired thermal equilibrium of the system.

It is evident that as the result of the use of indirect heat exchange for control of the exothermic polymerization reaction, my process will possess decided advantages over those processes heretofore used for this purpose. Not only will the heat input required in the heating coil be held to a minimum, but control of the reaction will be obtained far more readily than in those processes which use a simple insulated reaction chamber and rely on turbulence and intimate mixing of the incoming and reacting products to prevent the occurrence of excessive temperatures as a result of the exothermic nature of the conversion.

Having described my invention, what I claim is:

1. A process for converting normally gaseous hydrocarbons containing a substantial proportion of olefins into normally liquid hydrocarbons, which comprises passing a charge of said hydrocarbons under pressure in excess of 500 pounds per square inch through a heat exchanger in indirect heat exchange relation with reaction products, passing said hydrocarbons from said heat exchanger through a tube coil in which an increment of heat is imparted to said hydrocarbons, introducing said hydrocarbons from said tube coil into a reaction chamber through a plurality of confined passages, withdrawing said hydrocarbons from said reaction chamber by causing said hydrocarbons to flow unrestrictedly about said confined passages to impart exothermic heat to said incoming hydrocarbons introduced into said reaction chamber through said confined passages, withdrawing the reaction products from said reaction chamber and passing the same through said first mentioned heat exchanger in heat exchange relation with a charge of said hydrocarbons, and separating normally liquid hydrocarbons from the said reaction products.

2. A process for converting normally gaseous hydrocarbons containing a substantial proportion of olefins into normally liquid hydrocarbons, which comprises passing a charge of said hydrocarbons under pressure in excess of 500 pounds per square inch through a heat exchanger in indirect heat exchange relation with reaction products, passing said hydrocarbons from said heat exchanger through a tube coil in which an increment of heat is imparted to said hydrocarbons, introducing said hydrocarbons from said tube coil into a reaction chamber by restraining said hydrocarbons to flow through a plurality of confined passages to the interior of said reaction chamber, withdrawing said hydrocarbons from said reaction chamber by causing the said hydrocarbons to flow unrestrictedly about said passages and to impart exothermic heat to said incoming hydrocarbons introduced to said reaction chamber through said confined passages, withdrawing the reaction products from said reaction chamber and passing the same through said first mentioned heat exchanger in heat exchange relation with a charge of said hydrocarbons, and separating normally liquid hydrocarbons from the said reaction products.

3. A process for converting normally gaseous hydrocarbons containing a substantial proportion of olefins into normally liquid hydrocarbons, which comprises passing said gaseous hydrocarbons through a heating zone to impart an increment of heat thereto, passing said hydrocarbons through one or more passageways of restricted cross-sectional area in a reaction zone wherein said hydrocarbons are reacted with evolution of heat, and conducting said reacted hydrocarbons in indirect heat exchange relationship with said hydrocarbons entering the reaction zone and within the reaction zone.

4. A process for converting normally gaseous hydrocarbons containing a substantial proportion of olefins into normally liquid hydrocarbons, which comprises passing said gaseous hydrocarbons under pressure in excess of 500 pounds per square inch through a heating zone to impart an increment of heat thereto, passing said hydrocarbons through one or more passageways in a reaction zone wherein said hydrocarbons are reacted with evolution of heat, and conducting said reacted hydrocarbons in indirect heat exchange relationship with said hydrocarbons entering the reaction zone and within the reaction zone.

JESSE A. GUYER.